(12) United States Patent
Wang et al.

(10) Patent No.: US 6,525,890 B1
(45) Date of Patent: Feb. 25, 2003

(54) LATCH FOR OPTICAL ASSEMBLY

(75) Inventors: James P. Wang, Blacksburg, VA (US); Marc A. Schetselaar, Christiansburg, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/502,801

(22) Filed: Feb. 11, 2000

(51) Int. Cl.$^7$ .................. G02B 27/00; F21V 17/06; F21S 13/10
(52) U.S. Cl. .................. 359/896; 359/894; 362/433; 362/382; 362/430
(58) Field of Search ................. 359/885, 892, 359/601, 609, 896; 351/54; 362/433, 293, 16, 374, 382, 430

(56) References Cited

U.S. PATENT DOCUMENTS

| | | |
|---|---|---|
| 1,836,845 A | 12/1931 | Halvorson, Jr. |
| 2,007,528 A | 7/1935 | Graham |
| 2,975,271 A | 3/1961 | Dvorak |
| 3,096,029 A | 7/1963 | Berge |
| 3,281,588 A | 10/1966 | Spinetta |
| 3,340,393 A | 9/1967 | Franck et al. |
| 3,431,003 A | 3/1969 | Bacon, Jr. et al. |
| 3,530,287 A | 9/1970 | Husby |
| 3,654,453 A | 4/1972 | Jablonski |
| 3,983,387 A | 9/1976 | Van Steenhoven et al. |
| 4,091,444 A | 5/1978 | Mori |
| 4,222,093 A | 9/1980 | Garcia et al. |
| 4,363,086 A | 12/1982 | Fletcher |
| 4,424,993 A | 1/1984 | Shelby et al. |
| 4,654,768 A | 3/1987 | Dryman et al. |
| 4,863,256 A * | 9/1989 | McDougald .................. 351/54 |
| 4,910,650 A | 3/1990 | Goralnik |
| 5,081,569 A | 1/1992 | Quiogue et al. |
| 5,121,309 A | 6/1992 | Ewing et al. |
| 5,289,358 A | 2/1994 | Halemeier |
| 5,662,407 A | 9/1997 | Fischer et al. |
| 5,746,408 A * | 5/1998 | Theirl et al. .................. 359/609 |
| 6,102,556 A * | 8/2000 | Lieberman et al. ......... 359/892 |
| 6,116,749 A | 9/2000 | Quiogue et al. |
| 6,149,280 A | 11/2000 | Quingue et al. |

FOREIGN PATENT DOCUMENTS

GB    837214    6/1960

OTHER PUBLICATIONS

Advertisement for LSI Industries Scottsdale Lighting Fixture.

* cited by examiner

Primary Examiner—Audrey Chang
(74) Attorney, Agent, or Firm—Mark S. Bicks; Alfred N. Goodman; Tara L. Hoffman

(57) ABSTRACT

An optical assembly includes a frame member for holding an optical member, a mounting member releasably coupled to the frame member and having a latch engaging surface. A latch member is coupled to the frame member and is pivotally movable between locked and unlocked positions relative to the frame and mounting members. The latch member has a main body portion, a cam arm portion extending from a first surface at a first end of the main body portion, a handle portion extending from the first surface at an opposing second end of the main body portion, and a central positioning portion extending from the first surface between the cam arm and handle portions. A spring biasing member is disposed between the latch member and the frame member for biasing the latch member toward the locked position.

34 Claims, 4 Drawing Sheets

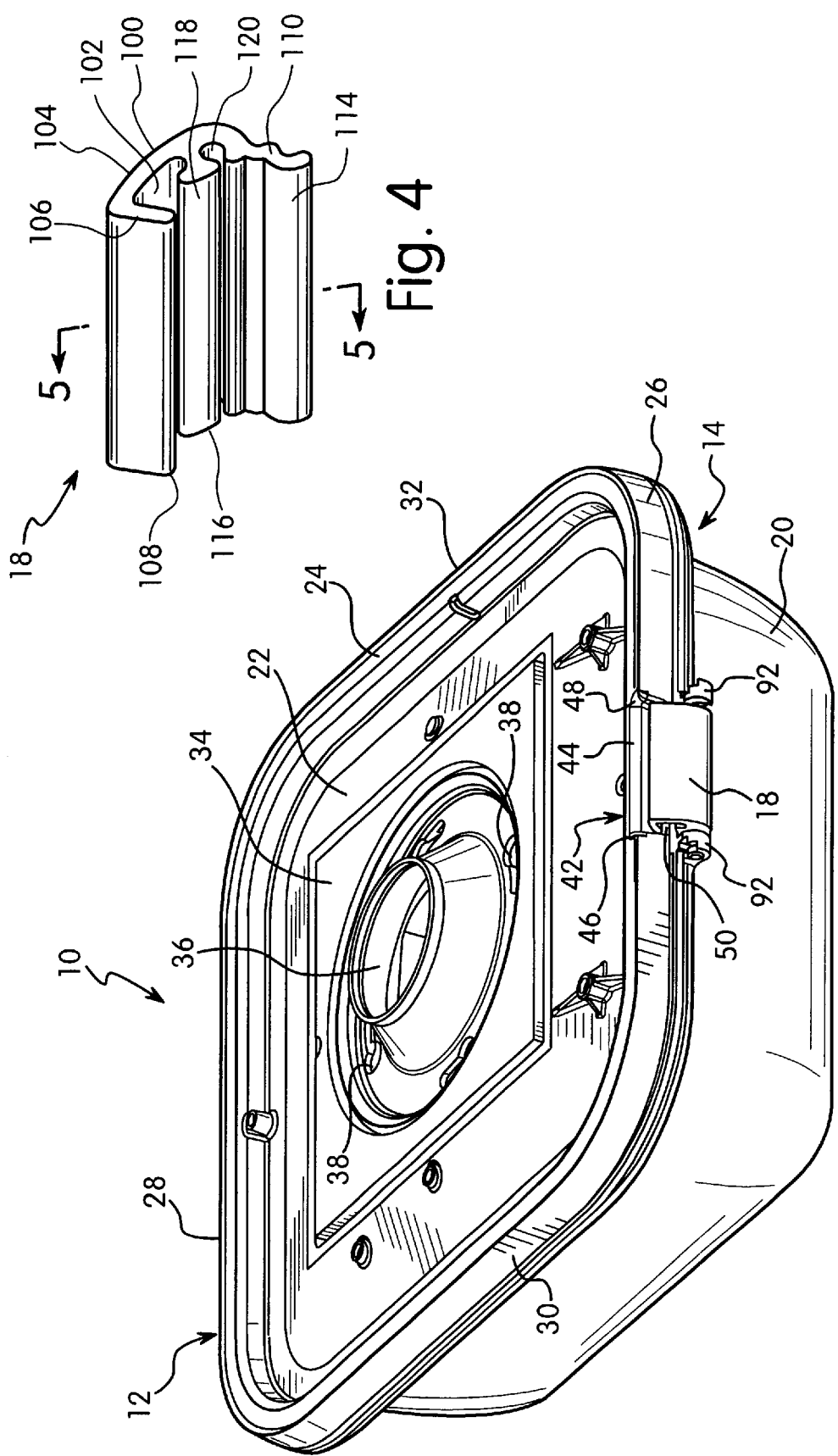

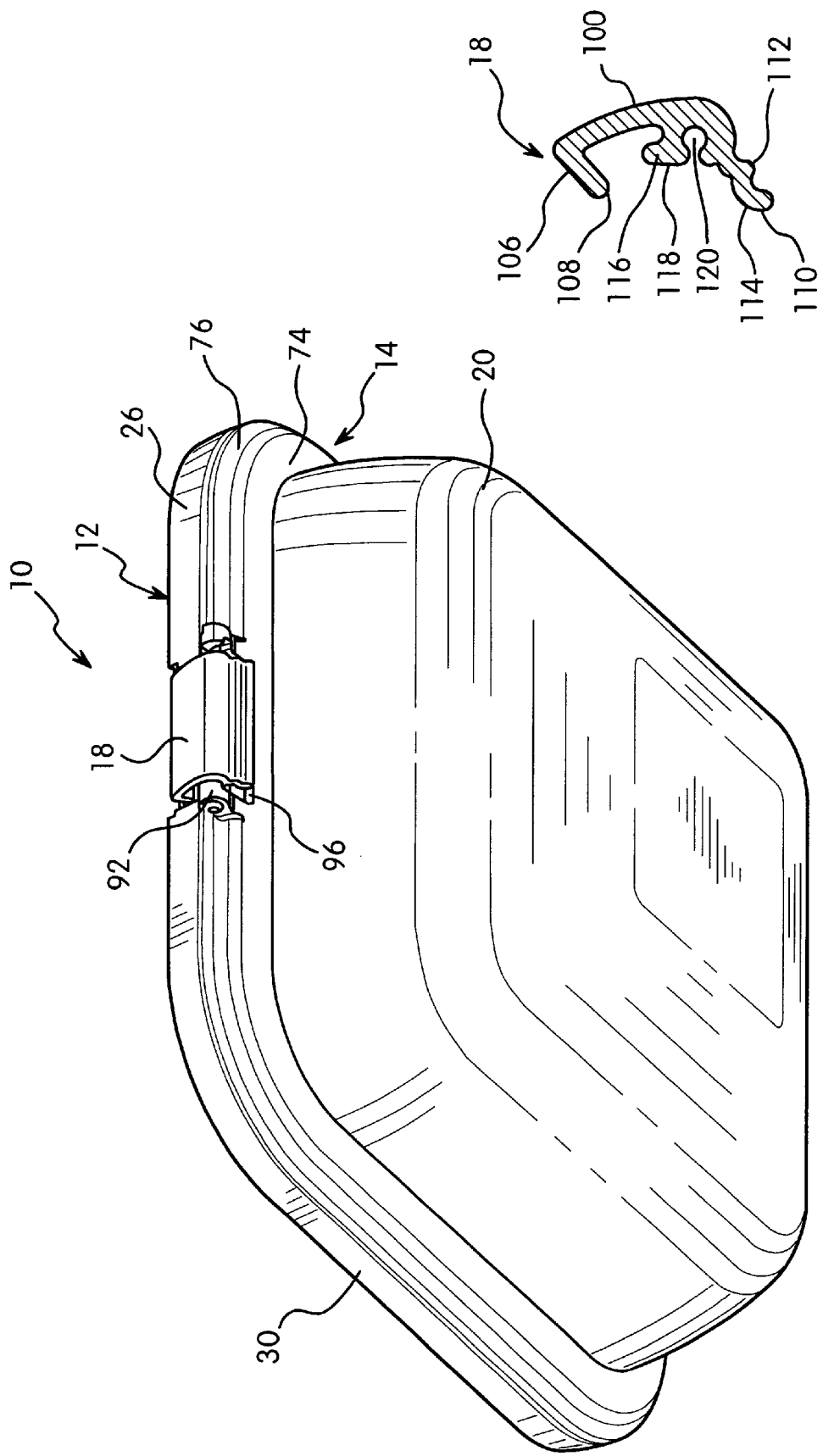

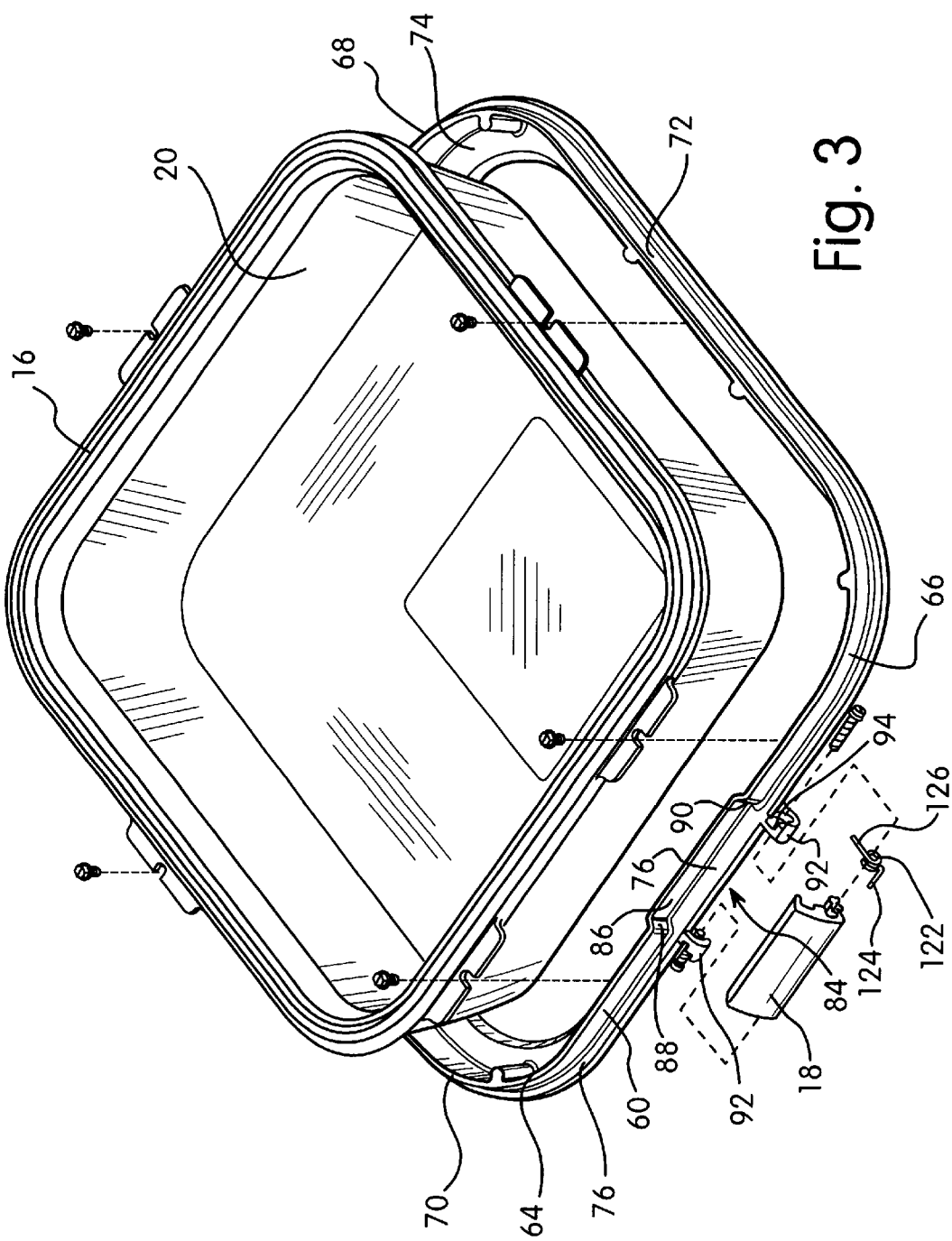

LATCH FOR OPTICAL ASSEMBLY

FIELD OF THE INVENTION

The present invention relates to a latch for overhang optical assemblies. The assemblies include a mounting member with a frame pivotally attached thereto. The latch that locks and unlocks the frame with respect to the mounting member. The latch facilitates easy access to the optical unit supported by the mounting member and optical lens supported by the frame.

BACKGROUND OF THE INVENTION

An overhang optical assembly, such as a canopy luminaire, is commonly mounted and overhung from a pole or ceiling either outdoors or indoors. The prior art optical assemblies combine a luminaire lens and lens frame with a latch for locking the lens frame to an optical assembly mounting frame. The mounting frame is attached to a luminaire housing or to another support. The lens and lens frame are movable between open and closed positions. In the open position, the lamp can be changed and the optical features (e.g. the reflector) inside the lens can be adjusted.

Gaining access to the optical unit within the prior art optical assemblies is typically difficult because a special tool, such as a probe or hook, is required to unlock the latch. In addition, access to the optical unit normally requires that the entire assembly be uninstalled. These difficulties are particularly acute when the luminaire, as is usually the case, is located a significant distance above ground level.

Other problems with present day optical assemblies are that the latches do not provide a weather tight closure thus allowing the elements of the surrounding environment, such as rain and dirt, to enter the interior of the assembly. Also, the prior art latches do not provide a means for ensuring that the lens frame of the optical assembly is positively locked to the mounting member. The lens frame may only be partially locked rather than completely locked. In addition, the latches of the conventional optical assemblies are bulky and protrude from the exposed lens frame, and thus, are not aesthetically pleasing. Finally, the conventional latches for optically assemblies are typically complicated and costly to manufacture.

SUMMARY OF THE INVENTION

Accordingly, an object of the present invention is to provide an optical assembly that includes a mounting member, a movable frame, and a toolless entry latch allowing easy access to the optical unit within the assembly.

Another object of the present invention is to provide an optical assembly that includes a latch that provides a weather tight closure between the mounting member and the frame.

A further object of the present invention is to provide an optical assembly that includes a latch with a positive locking feature.

Yet another object of the present invention is to provide an optical assembly including a compact and simply operable latch that is simple and cost efficient to manufacture and is aesthetically pleasing and rugged.

The foregoing objects are basically attained by an optical assembly comprising a frame member for holding an optical member having a positioning surface and a mounting member releasably coupled to the frame member, the mounting member having an engaging surface. The two members are relatively movable between open and closed positions. A latch member is coupled to the frame member and pivotally movable between locked and unlocked positions relative to the frame and mounting members. The latch member includes a main body portion with first and second surfaces, a cam arm portion extending from the first surface at a first end of the main body portion and engaging the engaging surface of the mounting member when the latch member is in its locked position, and a handle portion extending from the first surface at an opposing second end of the main body portion.

By forming the optical assembly in this manner, the latch can be unlocked without a tool by pushing and gripping the handle portion to facilitate access to the optical assembly interior. This latch also provides a positive, weather tight seal, and is simple to use, is inexpensive to manufacture, presents an aesthetic appearance.

Other objects, advantages and salient features of the invention will become apparent from the following detailed description, which taken in conjunction with the annexed drawings, discloses a preferred embodiment of the invention.

BRIEF DESCRIPTION OF THE DRAWINGS

Referring to the drawings which form a part of this disclosure:

FIG. 1 is a top, front side perspective view of an optical assembly according to an embodiment of the present invention, illustrating the latch locking the lens frame and mounting member together, with the lens frame supporting an optical lens;

FIG. 2 is a bottom, front side perspective view of the optical assembly illustrated in FIG. 1;

FIG. 3 is an exploded perspective view of the frame, latch, and optical lens of the optical assembly shown in FIG. 1, illustrating the mounting of the latch on the frame and the frame support of the optical lens;

FIG. 4 is rear side perspective view of the latch of the optical assembly illustrated in FIG. 1;

FIG. 5 is side elevational view in section of the latch taken along line 5—5 of FIG. 4;

DETAILED DESCRIPTION OF THE INVENTION

Figure 6:
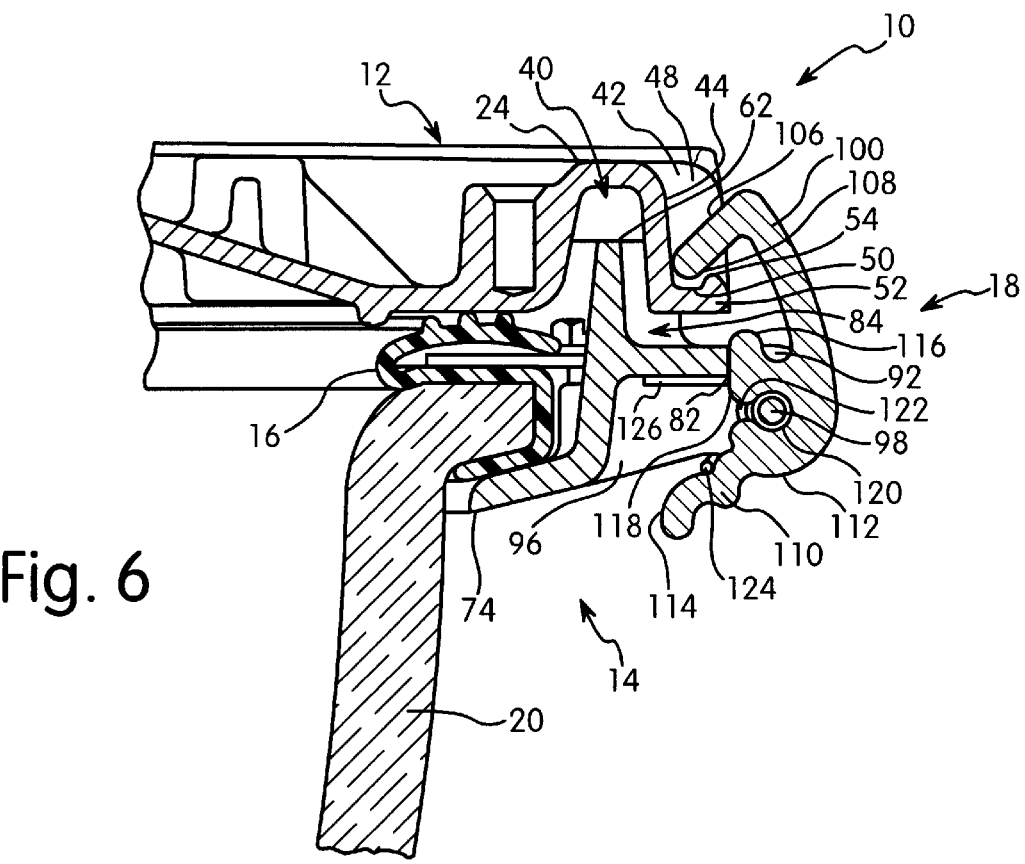
FIG. 6 is an enlarged, partial side elevational view in section of the optical assembly shown in FIG. 1, illustrating the latch mounted on the assembly in the locked position.

Referring to FIGS. 1–3, an optical assembly 10 according to the present invention includes a mounting member 12 for mounting optical assembly 10 to a ballast housing mounted in a ceiling or on a pole. A lens frame member 14 is pivotally connected to mounting member 12 by hinge members. A gasket 16 can be disposed between the mounting member and the lens frame to ensure the sealed connection therebetween. A latch member 18 is mounted on frame member 14, on its side opposite the hinge members, for locking and unlocking mounting and frame members 12 and 14. An optical member 20 is supported by frame 14. Preferably, mounting and frame members 12 and 14 are made of metal, but they can be formed of a plastic material as well.

The hinge members (not shown) pivotally connecting mounting and frame members 12 and 14 are fully disclosed in concurrently filed U.S. patent application Ser. No. 09/502,795 of James Wang et al. entitled Molded Hinge Assembly, the subject matter of which is hereby incorporated by reference.

Referring to FIGS. 1–2, and 6–7, mounting member 12 generally comprises a body portion 22 having four sides with a receiving shoulder 24 extending upwardly and around the entire periphery of body portion 22. Receiving shoulder 24 includes a front side 26, a rear side 28, a left side 30, and a right side 32 forming a substantially square shaped body portion 22 with rounded corners. However, body portion 22 can be of various circular or polygonal shapes as long as mounting member 12 can accommodate frame member 14. Mounting surface 34 includes a central aperture 36 for receiving an optical unit, such as a ballast. Key hole mounts 38 concentrically disposed around aperture 36 allow mounting member 12 to be mounted on the ballast supported on a ceiling or pole.

Receiving shoulder 24 further includes an interior passageway 40 for receiving frame member 14 such that receiving shoulder 24 has a substantially inverted U-shaped cross-sectional configuration. A first recessed surface or latch cavity 42 is disposed in the outer surface of front side 26 of receiving shoulder 24 for accommodating latch member 18. Cavity 42 includes a first rear wall 44, opposing first left and rights walls 46 and 48, and a first bottom wall 50 forming a substantially rectangular cavity. Cavity 42 can be of any shape as long as it can accommodate latch member 18. Bottom wall 50 specifically includes a lip 52 with and engaging surface 54 for engaging latch member 18 when it is in the locked position. Although it is preferable that cavity 42 be disposed on the front side of mounting member 12, it can be disposed on any side as long it corresponds with frame and latch members 14 and 18. In addition, receiving shoulder 24 is preferably a unitary one-piece member extending around mounting member 12, but sides 26, 28, 30, and 32 can be formed separately and integrally connected by any known attachment means.

Referring to FIGS. 1–7, lens frame member 14 includes a frame wall 60 with an upper end 62 and a lower end 64. Upper end 62 is received in interior passageway 40 of receiving shoulder 24 when frame member 14 and mounting member 12 are closed. Frame wall 60 has a front portion 66, a rear portion 68, a left portion 70, and right portion 72 forming a substantially square shaped frame with rounded comers that conforms to passageway 40 of receiving shoulder 24. Frame wall 60 can be of various circular or polygonal shapes as long as its shape corresponds to the shape of receiving shoulder 24 of mounting member 12.

A support wall 74 extends inwardly from lower end 64 along the inner perimeter of frame wall 60 for supporting optical member or lens 20. Conversely, a cantilever flange 76 extends outwardly from the outer surface of frame wall 60, between its upper and lower ends, for supporting shoulder 24 of mounting member 12. Flange 76 has substantially planar upper and lower surfaces 78 and 80, and a positioning or end surface 82 for properly positioning latch member 18 upon moving it between locked and unlocked positions.

A second recessed surface or cavity 84 is disposed in front portion 66 of frame wall 60, and corresponds to first receiving recess or cavity 42 on mounting member 12. Similar to cavity 42, cavity 84 includes a second rear wall 86 and opposing second left and right walls 88 and 90 with flange forming a bottom wall. Cavity 84 is wider and deeper than cavity 42 allowing cavity 42 to be received in cavity 84 when mounting and frame members 12 and 14 are in the closed position. In that position, first and second rear walls 44 and 86, first and second left walls 46 and 88, and first and second right walls 48 and 90 are adjacent one another, respectively. Gasket 16 provides a cushion between mounting member 12 and frame member 14 for protecting optical member 20, resulting in a space between rear walls 44 and 86 and first bottom wall 50 and flange 76, respectively.

Support mounts 92 extend outwardly from frame member 14 proximate flange 76 and cavity 84 for supporting latch member 18. Each support mount 92 includes a central fastening aperture 94 for receiving a fastener 98, such as screw. Upon being mounted to support mounts 92, latch member 18 can pivot between locked and unlocked positions. A clearance area 96 is defined beneath lower surface 80 of flange 76 for receiving latch member 18 when it is in the unlocked position.

Referring to FIGS. 3–7, latch member 18 includes a main body portion 100 with a cam arm portion 106 and a handle portion 110 extending therefrom at its upper and lower ends, respectively. The operation of latch 18 will be fully described below. Main body portion 100 has a first or rear surface 102 that is substantially concave and a second or front surface 104 that is substantially convex. In section transverse to its longitudinal axis, latch member 18 is substantially E-shaped as seen in FIG. 5.

Substantially planar cam arm portion 106 extends from rear surface 102 at a top end of main body portion 100 forming an acute angle therebetween. Cam arm portion 106 includes a latching end surface 108 at its distal end for engaging rear wall 44 and engaging surface 54 of lip 52 on mounting member 12 upon locking latch member 18.

At the opposite or bottom end of main body portion 100, handle portion 110 also extends from rear surface 102 forming an obtuse angle therebetween. Handle portion 110 includes a front gripping surface 112 for facilitating actuation of latch member 18 to an unlocked position. It is preferred that gripping surface 112 be substantially rippled to provide a better grip when handling latch 18, however, it can be planar. Similarly, handle portion 110 includes a rear surface 114 that is also rippled for receiving a portion of biasing member 122 (described below). Again, it is not necessary that rear surface 114 be rippled, it can also be planar.

A positioning portion 116 also extends from rear surface 102 of main body portion 100 between cam arm portion 106 and handle portion 110 for engaging positioning surface 82 of frame member 14. Positioning portion 116 preferably forms a foot-shaped extension with a flat stopping surface 118 on its end which directly abuts positioning surface 82 when latch member 18 is in the locked position. However, positioning portion 1 16 can be of various circular or planar shapes as long as stopping surface 118 abuts positioning surface 82 when latch member 18 is in its biased locked position. Also, between the bottom edge of positioning portion 116 and the top end of handle portion 110, fastener or screw hole 120 extends laterally along rear surface 102 of main body portion 100 for receiving screws 98 which allow latch member 18 to be pivotally mounted to support mounts 92 of frame member 14.

Although it is preferable that latch member 18 be made as a unitary one-piece member, main body portion 100, cam arm portion 106, handle portion 110, and positioning portion 116 can all be formed separately and integrally connected by any known attachment means. In addition, it is preferable that latch member 18 be made of a metallic material, such as extruded aluminum, but it can also be made of a plastic material. The compact simple design is aesthetically pleasing and allows latch member 18 to be efficiently and simply manufactured by injection molding.

Figure 7:
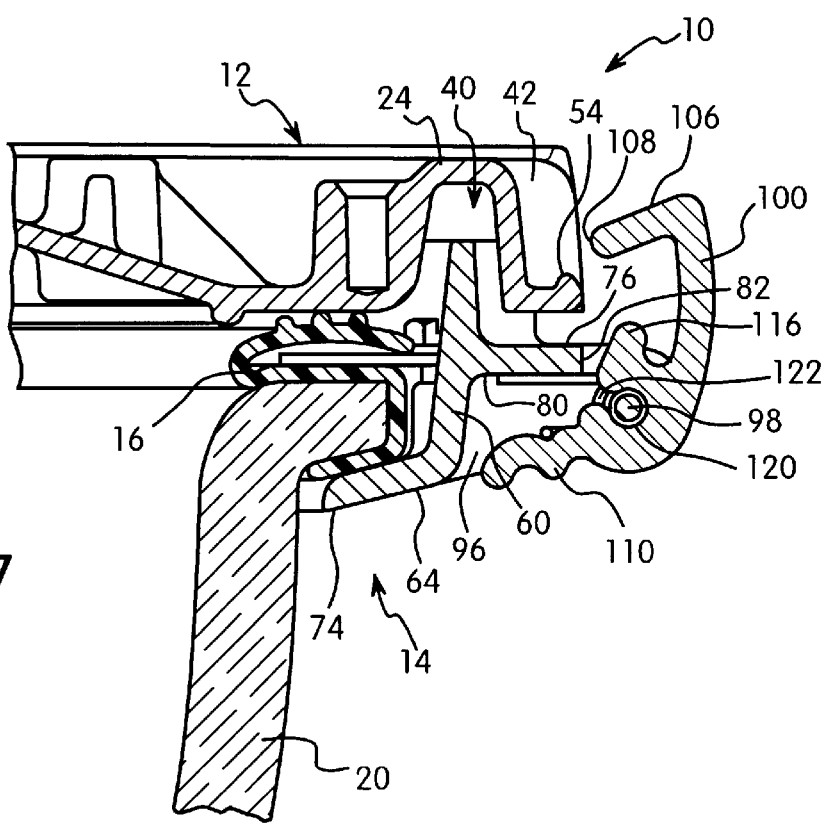
FIG. 7 is an enlarged, partial side elevational view in section of the optical assembly shown in FIG. 1, illustrating the latch mounted on the assembly in the unlocked position.

To mount latch member 18 to frame member 14, as seen in FIGS. 3 and 6–7, screws 98 are partially inserted into each support mount 92 and latch member 18 is placed in the space between the support mounts 92. A biasing member, such as a torsion spring, 122 is then placed on the right side of latch member 18 to bias latch member 18 toward the locked position where cam arm portion 106 is engaged with latch cavity 42. It is not necessary that biasing member 122 be placed on the right side of latch member 18 but can, in the alternative, be rotated and placed on the left side. A first arm 124 of biasing member 122 engages rear surface 114 of handle portion 110 and a second arm 126 engages lower surface 80 of flange 76 of frame member 14. Screws 98 are then inserted and tightened into the fastening apertures 94 of each support mount 92 and into the screw hole 120 of latch member 18 with one of the screws 98 also being inserted through biasing member 122. The design of latch member 18 allows it to be mounted close to frame member 14 such that it does not stick out and is more aesthetically pleasing.

Latch member 18, once mounted on frame member 14, operates to lock and unlock mounting and frame members 12 and 14 as seen in FIGS. 6 and 7. FIG. 6 illustrates latch member 18 in its biased locked position securing mounting and frame members 12 and 14 in a closed position. When in the closed position, latch cavity 42 of mounting member 12 rests in cavity 84 of frame member 14 and upper end 62 of frame wall 74 is received in interior passageway 40 of mounting member 12.

Latch member 18 is biased toward the locked position by first arm 124 of biasing member 122 engaging rear surface 114 and forcing handle portion backwards and cam arm portion 106 forward, i.e., latch 18 to rotate or pivot counterclockwise, as illustrated. Cam arm portion 106 engages latch cavity 42 of mounting member 12 by end surface 108 abutting rear wall 44 and engaging surface 54 of lip 52 preventing mounting and frame members 12 and 14 from separating and moving into an open position. By designing latch member 18 in this fashion, a weather tight closure is provided for optical assembly 10. In addition, a positive lock feature is provided ensuring that latch member 18 is fully locked and not partially locked.

FIG. 7 illustrates latch member 18 in the unlocked position. To unlock latch member 18, force is applied to handle portion 110 overcoming the bias of biasing member 122 and disengaging cam arm portion 106 from latch cavity 42, by rotating or pivoting latch 18 clockwise. This allows the lens frame member 14 to be drop thus providing a toolless entry into optical assembly 10. Specifically, handle portion 110 is moved into clearance area 96 provided below flange 76 of frame member 14; positioning portion 116 is simultaneously spaced from positioning surface 82, and cam arm portion 106 is simultaneously spaced from latch cavity 42. Thus optical assembly 10 can be easily opened by pushing on handle portion 110 and separating mounting and frame members 12 and 14, i.e., under the force of gravity, without the need for a special tool.

With lens 20 and its frame member 14 in its open position, work can be performed on the luminaire, for example, changing the lamp. After the work is completed the lens and frame member are pivoted to the closed position, as latch 18 automatically re-engages mounting member 12. In the open position of frame member 14, latch 18 is biased by spring 122 to the position illustrated in FIG. 6 with the positioning portion 116 abutting positioning surface 82. As the frame member approaches its closed position, cam arm portion 106 engages the free end of lip 52, causing the latch to pivot clockwise against the spring bias until latching end surface 108 can move past lip engaging surface 54. The spring causes the latch to pivot counterclockwise to engage lip 52 and lock the frame member in its closed position, once latching end surface 108 has moved beyond lip 52.

While a particular embodiment has been chosen to illustrate the invention, it will be understood by those skilled in the art that various changes and modifications can be made therein without departing from the scope of the invention as defined in the appended claims.

What is claimed is:

1. An optical assembly, comprising:

a frame member for holding an optical member and having a positioning surface;

a mounting member releasably coupled to said frame member and having an engaging surface, said frame member and said mounting member being relatively movable between open and closed positions; and a latch member coupled to said frame member and pivotally movable between locked and unlocked positions relative to said frame and mounting members, said latch member having, a main body portion with first and second surfaces and coupled to said frame, said first surface of said main body portion being substantially concave, a cam arm portion extending from said first surface at a first end of said main body portion and engaging said surface of said mounting member when said latch member is in the locked position, a handle portion extending from said first surface at an opposite second end of said main body portion, and a central positioning portion extending from said first surface between said first and second ends of said main body portion, whereby manipulation of said handle portion pivots said latch member about said central positioning portion between said locked and unlocked positions.

2. An optical assembly according to claim 1, wherein a biasing member is disposed between said latch member and said frame member biasing said latch member toward the locked position whereby upon applying force to said handle portion, the bias of said biasing member is overcome and said latch member is pivoted to the unlocked position unlocking said frame and mounting members.

3. An optical assembly according to claim 2, wherein said biasing member is a torsional spring.

4. An optical assembly according to claim 1, wherein said cam arm portion of said latch member is spaced from said engaging surface of said mounting member and said positioning portion is spaced from said positioning surface of said frame member when said latch member is in the unlocked position.

5. An optical assembly according to claim 1, wherein said handle portion further includes a gripping surface for facilitating actuation of said latch member.

6. An optical assembly according to claim 1, wherein said frame member includes an outwardly extending flange for supporting said latch member with a clearance area for said latch member to move between the locked and unlocked positions.

7. An optical assembly according to claim 1, wherein said central positioning portion of said latch member includes a centrally disposed fastening hole.

8. An optical assembly according to claim 7, wherein a fastener is received in said fastening hole; and said latch member pivots about said fastener.

9. An optical assembly according to claim 1, wherein said cam arm portion is angled downwardly from said first end of said main body portion forming a substantially acute angle therebetween.

10. An optical assembly according to claim 1, wherein said main body portion includes a longitudinal axis and said latch member is substantially E-shaped in section transverse to said longitudinal axis.

11. An optical assembly according to claim 1, wherein said latch member is a one-piece, unitary member.

12. An optical assembly according to claim 1, wherein said frame member includes an outer perimeter; and said latch member is located on said outer perimeter.

13. An optical assembly according to claim 1, wherein said positioning surface is an outer surface.

14. An optical assembly according to claim 1, wherein said central positioning portion is spaced from said positioning surface of said frame member when said latch member is in the unlocked position.

15. An optical assembly according to claim 1, wherein each of said cam arm portion, said central positioning portion and said handle portion, respectively, are fixed relative to one another.

16. An optical assembly, comprising:

a frame member for holding an optical member and having a positioning surface;

a mounting member releasably coupled to said frame member and having an engaging surface, said frame member and said mounting member being relatively movable between open and closed positions;

a latch member coupled to said frame member and pivotally movable between locked and unlocked positions relative to said frame and mounting members, said latch member having a substantially curved main body portion with first and second surfaces, a cam arm portion extending from said first surface at a first end of said main body portion, a handle portion extending from said first surface at an opposite second end of said main body portion, and a central positioning portion extending from said first surface between said cam arm and handle portions; and a spring, disposed between said latch member and said frame member, biasing said latch member toward the locked position, said positioning portion of said latch member engaging said positioning surface of said frame member in the locked position, and said cam arm portion of said latch member engaging said engaging surface of said mounting member locking said frame and mounting members in the locked position, whereby upon applying force to said handle portion, the bias of said spring is overcome and said latch member is pivoted about said central positioning portion to the unlocked position unlocking said frame and mounting members.

17. An optical assembly according to claim 16, wherein said cam arm portion of said latch member is spaced from said engaging surface of said mounting member and said positioning portion is spaced from said positioning surface of said frame member when said latch is in the unlocked position.

18. An optical assembly according to claim 16 wherein said central positioning portion of said latch member includes a fastening hole disposed between said positioning portion and said handle portion.

19. An optical assembly according to claim 16, wherein said frame member includes an outwardly extending flange for supporting said latch member and providing a clearance area for said latch member to move between the locked an unlocked positions.

20. An optical assembly according to claim 15, wherein said latch member is mounted to a support mount extending from said flange by a fastener that engages said fastening hole and said support mount.

21. An optical assembly according to claim 20, wherein said spring is a torsional spring disposed on said fastener between said latch member and said support mount.

22. An optical assembly according to claim 16, wherein said spring is separable from each of said frame and latch members, respectively.

23. An optical assembly according to claim 16, wherein said positioning surface of said frame is an outer surface; and said central positioning portion of said latch engages said positioning surface of said frame when said latch member is in the locked position.

24. An optical assembly according to claim 16, wherein each of said cam arm portion, said central positioning portion and said handle portion, respectively, are fixed relative to one another.

25. An optical assembly, comprising:

a mounting member having a peripheral receiving shoulder with an engaging surface and a first recessed surface;

a frame member for holding an optical member and coupled to said mounting member for movement between open and closed positions, said frame member having a peripheral frame wall received in said receiving shoulder of said mounting member with a second recessed surface corresponding to said first recessed surface of said mounting member and a cantilever flange extending therefrom, said flange having a support mount extending therefrom proximate said second recessed surface and a positioning surface thereon;

a latch member pivotally movable between locked and unlocked positions relative to said frame and mounting members, said latch member having a main body portion coupled to said frame and with a substantially concave first surface, a cam arm portion extending from said first surface at a first end of said main body portion, a handle portion extending from said first surface at an opposing second end of said main body portion, and a central positioning portion extending from said first surface between said cam arm and handle portions, a fastening hole disposed between said central positioning portion and said handle portion, said latch member being coupled to said support mount of said frame member by a fastener engaging said fastening hole and said support mount; and a torsional spring disposed on said fastener between said latch member and said support mount of said frame member, biasing said latch member toward the locked position, said first recessed portion of said frame member receiving said second recessed portion of said mounting member in the locked position, said positioning portion of said latch member engaging said positioning surface of said frame member in the locked position, and said cam arm portion of said latch member engaging said engaging surface of said mounting member locking said frame and mounting members in the locked position.

26. An optical assembly according to claim 15, wherein each of said cam arm portion, said central positioning portion and said handle portion, respectively, are fixed relative to one another.

27. An optical assembly, comprising:
a frame member for holding an optical member;
a mounting member releasably coupled to said frame member and having an engaging surface, said frame member and said mounting member being relatively movable between open and closed positions; and
a latch member coupled to said frame member pivotally movable between locked and unlocked positions relative to said frame and mounting members, said latch member having,
  a cam arm portion extending from a first end of said latch member,
  a handle portion extending from a second end of said latch member remote from said cam arm portion, and
  a central pivot coupled to said frame member and disposed between said cam arm portion and said handle portion, manipulation of said handle portion pivoting said latch member about said central pivot between said locked and unlocked positions,
whereby said cam arm portion engages said engaging surface of said mounting member when said latch member is in said locked position and said cam arm portion is spaced from said engaging surface when said latch member is in said unlocked position.

28. An optical assembly according to claim 27, wherein said frame member includes an outer perimeter; and
said latch member is coupled to said outer perimeter so that latch member is outside of said frame member.

29. An optical assembly according to claim 27, wherein said central pivot includes a central positioning portion that engages said frame member when said latch member is said locked position and is spaced from said frame member when said latch member is said unlocked position.

30. An optical assembly according to claim 27, wherein said central pivot includes a fastening hole that receives a fastener about which said latch member pivots.

31. An optical assembly according to claim 27, wherein a biasing member coupled to said central pivot biases said latch member in said locked position.

32. An optical assembly according to claim 31, wherein manipulation of said handle portion toward said frame member overcomes said biasing member and moves said latch member to said unlocked position.

33. An optical assembly according to claim 27, wherein said latch member is a unitary one-piece member.

34. An optical assembly according to claim 27, wherein each of said cam arm portion, said central pivot and said handle portion, respectively, are fixed relative to one another.

* * * * *